United States Patent [19]
Olson et al.

[11] Patent Number: 5,420,791
[45] Date of Patent: May 30, 1995

[54] SUPPLEMENTAL FRONT WHEEL DRIVE CONTROL SYSTEM

[75] Inventors: Stephen R. Olson; William J. Tate, both of Peoria; Giles K. Sorrells, Dunlap, all of Ill.

[73] Assignee: Caterpillar Inc., Peoria, Ill.

[21] Appl. No.: 272,888

[22] Filed: Jul. 8, 1994

Related U.S. Application Data

[63] Continuation of Ser. No. 623,155, Dec. 6, 1990, Pat. No. 5,361,208.

[51] Int. Cl.⁶ .................. B60K 25/00; B60K 23/08
[52] U.S. Cl. ...................... 364/424.05; 364/424.07; 180/243
[58] Field of Search .................. 364/424.05, 424.07, 364/424.1, 160, 161, 162, 163, 165, 426.01, 426.03; 180/233, 242, 243, 247, 248, 6.48, 6.5, 197

[56] References Cited

U.S. PATENT DOCUMENTS

| | | | |
|---|---|---|---|
| 3,344,993 | 10/1967 | Wilder et al. | 239/164 |
| 4,183,419 | 1/1980 | Henn et al. | 180/243 |
| 4,186,816 | 2/1980 | Pfundstein | 180/243 |
| 4,236,595 | 12/1980 | Beck et al. | 180/243 |
| 4,295,539 | 10/1981 | Beck et al. | 180/293 |
| 4,444,286 | 4/1984 | Hawkins et al. | 180/197 |
| 4,480,502 | 11/1984 | Nembach | 180/293 X |
| 4,554,991 | 11/1985 | Eden | 180/293 |
| 4,635,743 | 1/1987 | Riehl | 180/243 |
| 4,956,776 | 9/1990 | Carre | 364/162 X |
| 4,986,377 | 1/1991 | Moriarty | 180/6.5 |
| 4,986,388 | 1/1991 | Matsuda | 180/248 |
| 5,361,208 | 11/1994 | Olson et al. | 364/424.05 |

OTHER PUBLICATIONS

P. 16 of Jan. 1990 Issue of Oem Magazine—Areticle Entitled "Deere Designs a Motor Grader Digital Controller" Jan. 1990.

*Primary Examiner*—Kevin J. Teska
*Assistant Examiner*—Collin W. Park
*Attorney, Agent, or Firm*—Alan J. Hickman

[57] ABSTRACT

An electronic control is provided for controlling the drive speed of a supplemental drive relative to an engine driven main drive of a vehicle. A fluid pump driven by the engine provides pressurized fluid flow. The supplemental drive is driven by the pressurized fluid. A main drive sensor senses the speed of the main drive and responsively produces a main drive speed signal. A command knob is provided for selecting a desired speed relationship between the main and supplemental drives. A knob sensor senses the position of the command knob and responsively produces a modifier signal. A modifier circuit receives the main drive speed and modifier signals and responsively produces a modified main drive speed signal. A supplemental drive sensor senses the speed of the supplemental drive and responsively produces a supplemental drive speed signal. A processor produces an error signal responsive to a difference between received modified main and supplemental drive speed signals. The processor produces a first signal responsive to a product of the error signal and a preselected constant, produces a second signal responsive to an integral of the error signal, produces a third signal responsive to a derivative of the error signal and produces a pump control signal in response to a sum of the first, second, and third signals. An actuator receives the pump control signal and responsively adjusts the pump output.

5 Claims, 10 Drawing Sheets

Fig_4A_

Fig. 4B

Fig_5A_

Fig_5B_

Fig_5C_

Fig_5D_

Fig_5E_

SUPPLEMENTAL FRONT WHEEL DRIVE CONTROL SYSTEM

This is a continuation application Ser. No. 07/623,155, filed Dec. 6, 1990, now U.S. Pat. No. 5,361,208.

TECHNICAL FIELD

The present invention relates generally to vehicle drive systems and, more particularly, to an electronic control for a supplemental hydrostatic front wheel drive.

BACKGROUND ART

In motor graders, the rear wheels are commonly driven directly by the engine through a transmission and differential gearing. Further, it is common to supplement the main drive by means of a hydrostatic front wheel drive system. More specifically, the supplemental drive typically includes a fluid pump driven by the engine for providing pressurized fluid to fluid motors. The motors in turn drive the front wheels thereby supplementing the main rear wheel drive. In the past, supplemental hydrostatic drives have been developed which automatically shifted between two or more torque levels in response to the transmission ratio and/or hydraulic system pressure. These systems were continuously powered to provide supplementary hydrostatic drive for the main drive but had no provision for operation only on demand when the main drive loses traction. However, since the supplemental hydrostatic drive is notably less efficient than the main direct drive, it is desirable to reduce unnecessary utilization of the hydrostatic drive.

Recent attempts to overcome the problems associated with these systems have included electronic controls for varying the speed of the front wheels in response to the speed of the rear wheels. More specifically, these systems commonly utilize speed sensors to monitor front and rear wheel speeds and a closed loop electronic control for varying pump displacement to maintain a preselected speed relationship between the front and rear wheels.

In some motor graders manufactured by the assignee hereof, the vehicle operator is able to manually control the torque produced by he supplemental drive. These vehicles include an open loop control wherein the pump and motor displacement in the supplemental drive are adjusted in response to a manually operable control lever. However, these systems do not provide a maximum efficiency since control of the hydrostatic drive is a the operators discretion. Therefore, it is desirable to provide a system in which operation of the hydrostatic system is automatically controlled to maintain maximum operating efficiency.

One way in which automatic control of the hydrostatic drive can be achieved is through the use of a closed loop feedback system.

One such system is disclosed in U.S. Pat. No. 4,186,816 which issued to Pfundstein on Feb. 5, 1980, hereinafter referred to as '816. The '816 patent discloses a closed loop electronic speed feedback system for automatically controlling the supplemental drive system of a motor grader. More specifically, closed loop feedback electronics control a servo actuated pump that is connected by a hydraulic system to a pair of front wheel hydrostatic drive motors. The supplemental drive for the motor grader has three modes of operation. The first mode is the "off" mode in which the front drive wheels are free running and unpowered. The second mode is the "normal" mode where the control system allows a predetermined amount speed differential between the main and supplemental drive wheels before the supplemental hydrostatically driven wheels begin to supplement the main drive wheels. The third mode is an "overspeed" mode where the control system provides a predetermined percentage of overspeed of the auxiliary drive wheels to provide a continuous, positive supplementary drive.

As mentioned previously, hydrostatic drives are much less efficient than direct drives and, therefore, it is desirable to utilize the supplemental drive in the most efficient manner possible. The present invention is directed to that end.

DISCLOSURE OF THE INVENTION

An electronic control is provided for a vehicle having an engine, a main drive driven by the engine and being operative to propel the vehicle. A fluid pump is driven by the engine and is responsive to provide pressurized fluid. A supplemental drive is driven by the pressurized fluid and is operative to propel the vehicle. The control includes main drive sensor for sensing the speed of the main drive and responsively producing a main drive speed signal. A command knob is provided for selecting a desired speed relationship between the main and supplemental drives. A knob sensor means senses the position of the command knob and responsively produces a modifier signal. A modifier circuit receives the main drive speed and modifier signals and responsively produces a modified main drive speed signal. A supplemental drive sensor is provided for sensing the speed of the supplemental drive and responsively producing a supplemental drive speed signal. A processor receives the modified main and supplemental drive speed signals and produces an error signal responsive to a difference between the received signals. The processor produces a first signal responsive to a product of the error signal and a preselected constant, produces a second signal responsive to an integral of the error signal, produces a third signal responsive to a derivative of the error signal and produces a pump control signal in response to a sum of the first, second, and third signals. An actuator receives the pump control signal and responsively adjusts the pump so as to vary the pressure of the pressurized fluid produced by the pump in response to the pump control signal.

BEST MODE FOR CARRYING OUT THE INVENTION

Figure 1:
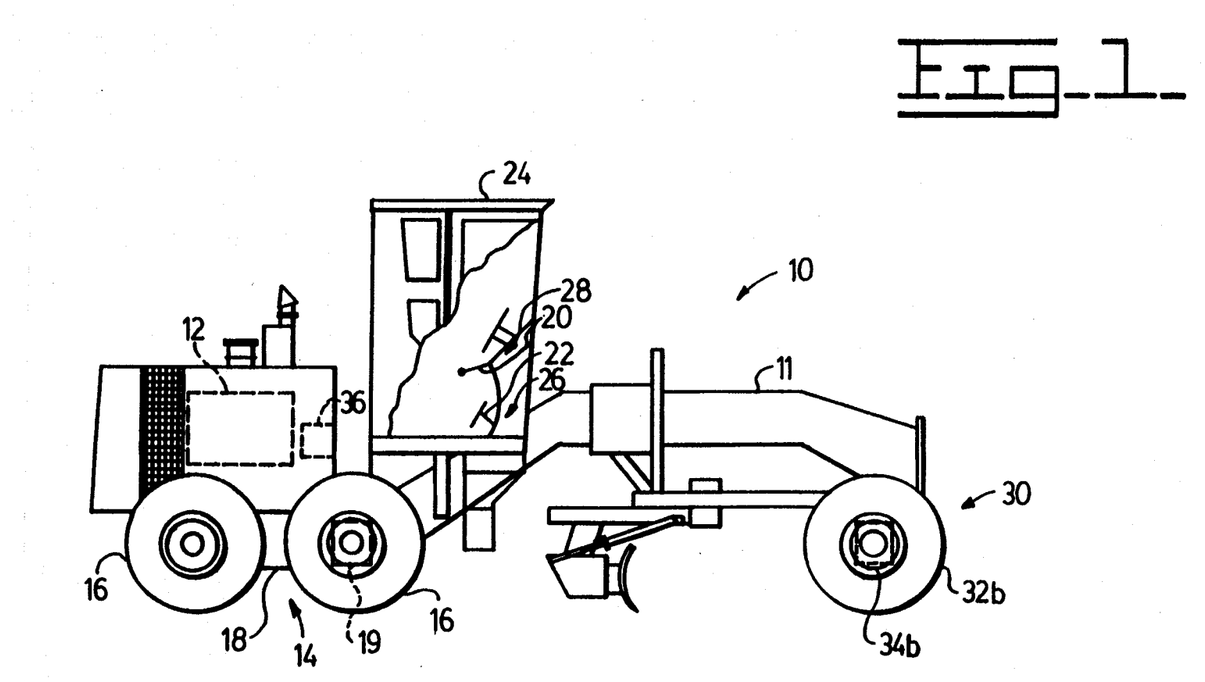
FIG. 1 is a side view of an industrial motor grader schematically illustrating the general location of most of the principal drive components including the supplemental hydrostatic drive.

Referring now to FIG. 1, there is shown a work vehicle 10 and, more particularly, an industrial motor grader 11 having a main internal combustion engine 12 driving a main drive 14. The main drive 14 includes a pair of rear wheels 16 driven by the engine 12 through a conventional electronically controlled and hydraulically actuated transmission 18 and a rear differential 19, as is common in the art. The transmission 18 is responsive to a gear selector 20 and a clutch pedal 22 which are both located in an operator's compartment 24 of the motor grader 11.

More particularly, a clutch pedal sensor 26 is provided for sensing the position of the clutch pedal and responsively producing a clutch pedal position signal. Preferably, the clutch pedal sensor 26 is in the form of an electrical switch (not shown) which is connected to ground when the clutch pedal 22 is depressed and open potential when the clutch pedal 22 is released. Similarly, a gear selector sensor means 28 produces a gear selector signal responsive to the position of the gear selector 20. The gear selector 20 is movable between eight forward gear positions, a neutral position and six reverse gear positions. The gear selector sensor produces a unique output for each of these positions. The clutch pedal and gear selector position signals are delivered to transmission solenoids (not shown) for controlling actuation of the transmission 18 in a conventional manner.

Figure 2:
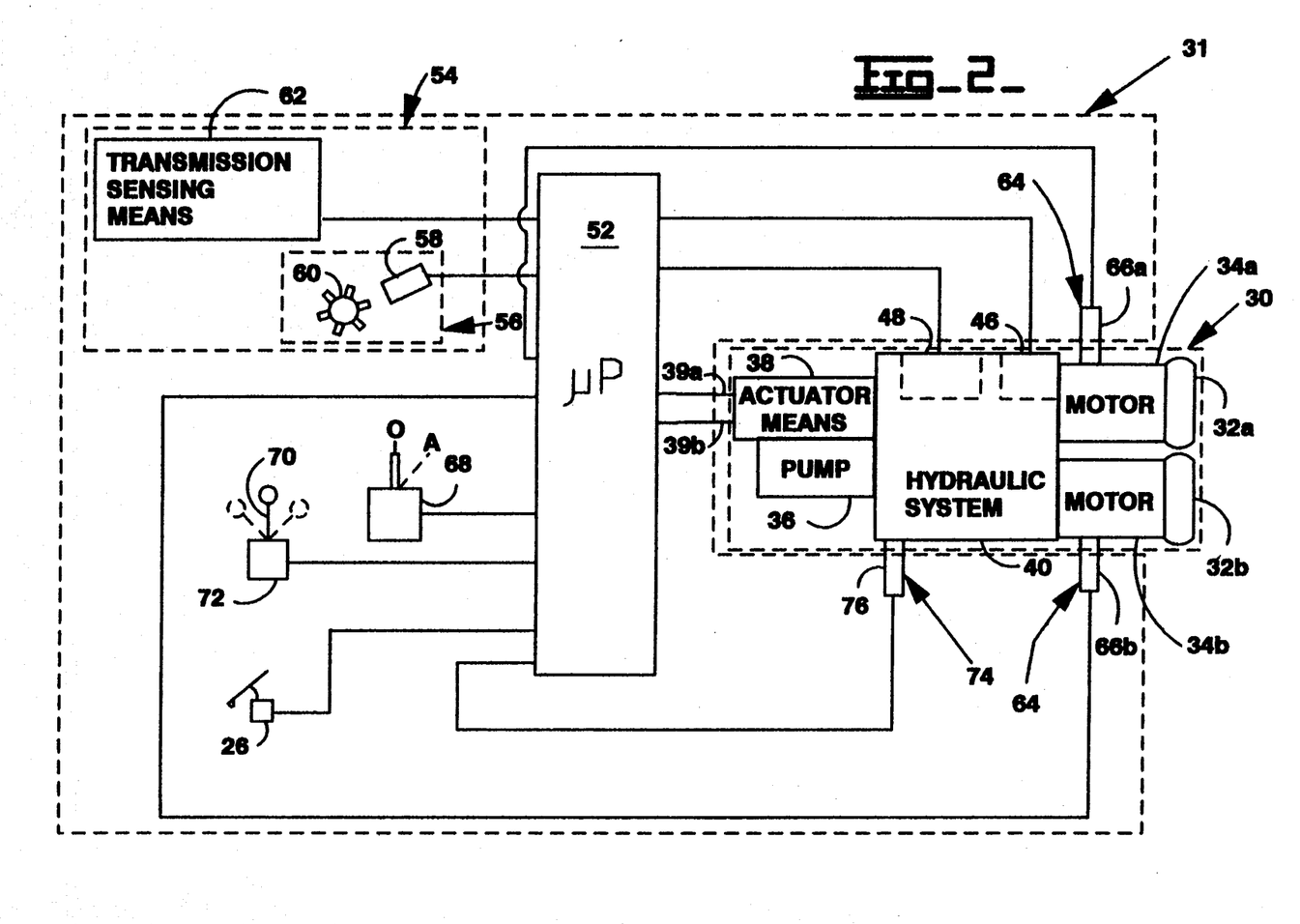
FIG. 2 is a schematic illustration of an electronic control of one embodiment of the present invention.

Referring additionally now to FIG. 2, a supplemental hydrostatic front wheel drive 30 for the motor grader 11 will now be discussed. The supplemental drive 30 includes left and right front drive wheels 32a, 32b driven by respective hydraulic motors 34a, 34b. A hydraulic pump 36 is driven by the engine 12 for providing pressurized fluid to the motors 34a, 34b. The hydraulic pump 36 is a reversible variable displacement pump as is common in the art. An actuator means 38 receives a control signal from an electronic control 31 and responsively adjusts the direction and displacement of the pump 36. More specifically, the actuator means 38 includes forward and reverse pump actuators (not shown) which are responsive, respectively, to forward and reverse pump control signals produced by the electronic control 31. The electronic control 31 selectively delivers either the forward or reverse pump control signal to the actuator means 38 over first and second electrical conductors 39a, 39b, respectively, in response to the direction of the main drive 14. It should be understood that a nonreversible pump could be utilized in conjunction with a reversing valve for supplying the pressurized fluid to the motors 34a, 34b, as opposed to using the reversible variable displacement pump 36.

Figure 3A:
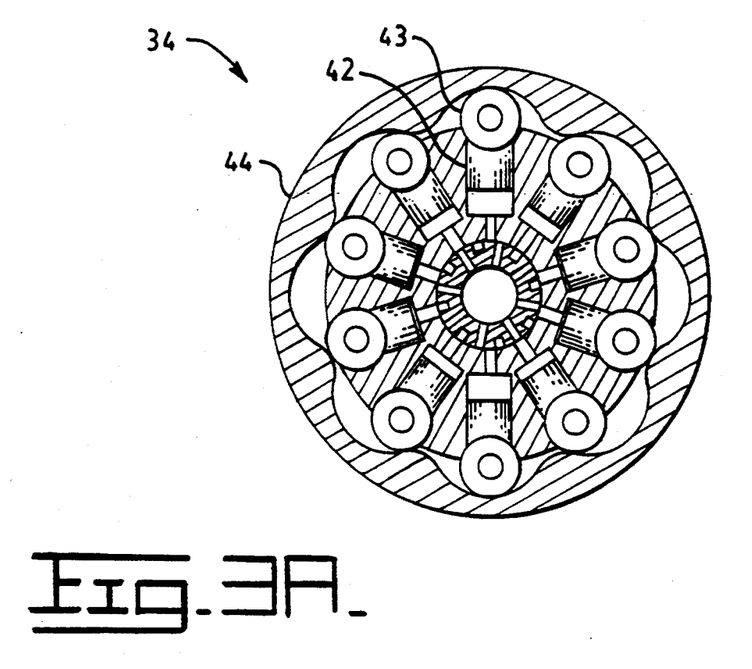
FIGS. 3A–B are schematic illustration showing generally the construction of the hydraulic motors.
Figure 3B:
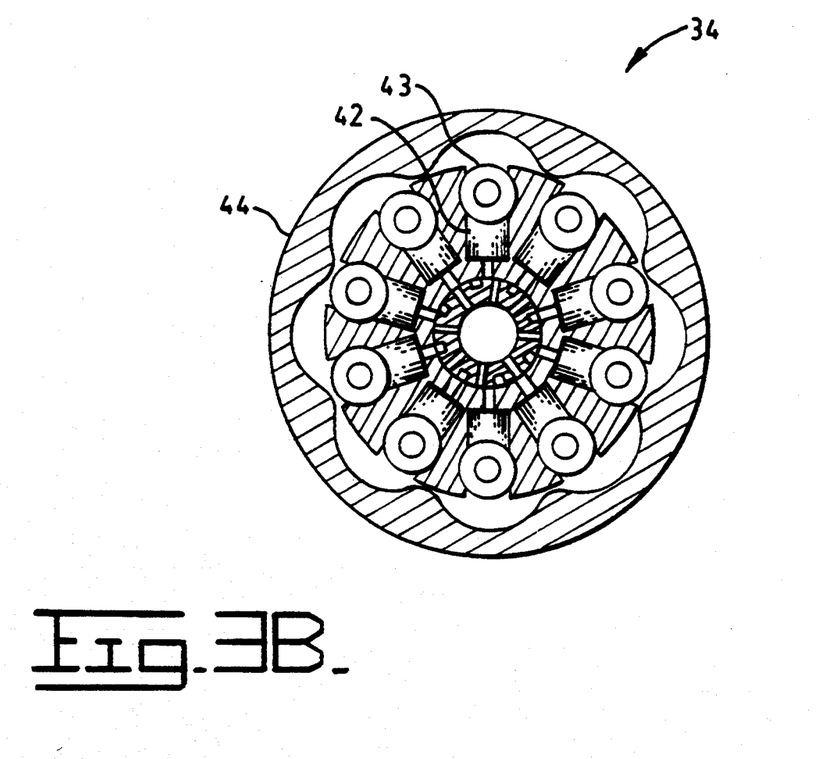

The pressurized fluid is supplied to the motors 34a, 34b through a hydraulic system 40 to power the motors 34a, 34b and drive the wheels 32a, 32b. The hydraulic motors 34a, 34b are rotating housing, radial piston designs, one of which is shown generally in FIGS. 3A-B. It should be understood that the type of hydraulic motor used forms no part of the immediate invention and, therefore, only a brief description of the motors 34a, 34b will be given. Each motor 34a, 34b includes a plurality of pistons 42 having respective rollers 43 which work outwardly against a cam ring 44 to impart rotary motion in the cam ring 44. The cam ring 44 are rigidly connected to and rotatable with respective drive wheels 32a, 32b for propelling the vehicle. Each motor 34a, 34b includes a rotating distribution valve (not shown) which is timed to selectively direct fluid to and from the pistons 42. In the preferred embodiment, the hydraulic motors 34a, 34b are a model H20 as manufactured by Poclain, Inc.

The motors 34a, 34b operate at either 100% or 40% displacement. The electronic control 31 determines the gear ratio of the main transmission 18 and responsively delivers a motor displacement control signal to a motor displacement control means 46 for controlling the displacement of the motors 34a, 34b. The motors 34a, 34b operate at 100% displacement in forward gears 1–4 and reverse gears 1–3, and 40% displacement in forward gears 5–7 and reverse gears 4–5. The motor displacement control means 46 includes an on/off solenoid actuated valve (not shown) for controlling fluid flow to the pistons 42 in response to the motor displacement control signal. More specifically, in the 100% mode the solenoid actuated valve is deenergized, thereby causing the distribution valve to selectively direct fluid flow to all of the pistons 42a–j. Whereas, in the 40% mode, the solenoid actuated valve is energized thereby causing the distribution valve to selectively direct fluid flow to only 40% of the pistons 42. Since the pressurized fluid is being distributed between fewer pistons 42 in the 40% mode, the pistons 42 act more rapidly, thereby causing the cam rings 44 to rotate at a higher speed for a given fluid pressure.

The hydraulic system 40 also includes a solenoid actuated freewheel valve 48, hereinafter referred to as the freewheel valve 48, which is responsive to a freewheel control signal from the electronic control 31 for controlling fluid flow to the motors 34a, 34b. More specifically, when the freewheel solenoid 48 is deenergized, the pistons 42 in each motor 34a, 34b are fully retracted as shown in FIG. 4b. When this occurs the contact between the rollers 43 and the cam rings 44 is broken which allows the associated wheels 32a, 32b to rotate freely. The freewheel mode is obtained by pressurizing the motor case (not shown) through a drain port (not shown) and simultaneously connecting the distribution valve to tank (not shown) with zero back pressure. In the absence of fluid pressure, the pistons 42 are biased to their retracted position by respective bias springs (not shown). Production of the freewheel control signal will be explained in greater detail below in connection with the electronic control 31.

Referring now again to FIG. 2, the electronic control 31 will be explained in greater detail. The electronic control 31 includes a controller means 50 which is electrically connected to a variety of sensors through conventional conditioning circuits (not shown) for receiving respective input signals. The controller means 50 processes these signals and responsively delivers a plurality of control signals to the supplemental drive 30 to effect operation of the supplemental drive 30 in a manner as explained below. The controller means 50 may be implemented with any suitable hardware including analog or digital circuits which may be either discrete components or integrated circuits. However, in the preferred embodiment, the controller means 50 is implemented employing a microprocessor 52 having external RAM and ROM (not shown) and being programmed to control operation of the supplemental drive 30 as explained below. A number of commercially available devices are adequate to perform the control functions, such as the MC6800 series components manufactured by Motorola, Inc. Using a microprocessor in such a system is preferable because the overall system is simplified in comparison to a system embodied in discrete components or integrated circuits. Furthermore, a microprocessor based system can be modified easily through software changes and updates.

A main drive sensor means 54 senses the speed of the main drive 14 and responsively produces a main drive speed signal. The main drive sensor means 54 includes an engine speed sensor means 56 for sensing the speed of the engine 12 and producing an engine speed signal. The engine speed sensor means 56 can be any type of sensor that accurately produces an electrical signal in response engine crankshaft speed. However, in the preferred embodiment, the engine speed sensor means 56 includes a magnetic pick-up sensor 58 mounted on an engine flywheel housing (not shown) for sensing rotation of a toothed gear 60 which rotates at a speed responsive to engine crankshaft speed. The magnetic pick-up sensor 58 produces an electrical signal having a frequency responsive to the rotational speed of the gear 60 and thus engine speed.

The main drive sensor means 54 further includes a transmission sensing means 62 for sensing the transmission's gear ratio and responsively producing a gear ratio signal. More specifically, the controller means 50 is electronically connected to the transmission solenoids (not shown) for detecting the gear position of the transmission 18. An energized solenoid is associated with logic "0" and a deenergized solenoid is equated to logic "1". For each transmission gear ratio, a unique gear code signal is produced in response to the energization state of the transmission solenoids. The controller means 50 receives the gear code signal and accesses a lookup table stored in memory to determine the transmission gear ratio and responsively produces a gear ratio signal. The controller means 50 further receives the engine speed signal, calculates the speed of the main drive speed in response to the engine speed signal and gear ratio signals, and produces a main drive speed signal corresponding to the calculated speed. The main drive sensor means 54 could take numerous other forms without departing from the scope of the invention. For example, it could be embodied in a speed sensor operatively associated with an output shaft (not shown) of the transmission 18 for sensing the rotational speed of the shaft and responsively producing a signal corresponding to the speed of the main drive 14.

A supplemental drive speed sensor means 64 is provided for sensing the speed of the supplemental drive 30 and responsively producing a supplemental drive speed signal. The supplemental drive speed sensor means 64 includes first and second speed transducers 66a,b for respectively sensing the speeds of the left and right drive wheels 32a, 32b and responsively producing respective first and second speed signals. The first and second speed transducers 66a,b produce electrical signals having frequencies responsive to the speed of the left and right front drive wheels 32a, 32b, respectively. The processor means 50 receives the first and second speed signals and produces the supplemental drive speed signal in response to the average of the first and second signals. The average front wheel speed is used to provide more accurate indication of the front wheel speed than could be obtained by sensing the speed of only one wheel 32a, 32b. For example, when vehicle is cornering, the outside wheel rotates faster than does the inside wheel. Therefore, sensing the speed of one of the wheel gives an inaccurate indication of the true front wheel speed.

A mode switch 68 is provided for producing a mode signal corresponding to a desired operating mode for the supplemental drive 30. The mode switch 68 is in the form of a two position switch where the positions, indicated by "O" and "A", correspond respectively to "off" and "automatic" modes of supplemental drive operation. In the "off" mode, the front drive wheels 32a, 32b are free running and unpowered. While in the "automatic" mode, the fluid pressure in the supplemental drive 30 is controlled to maintain a selected speed relationship between the main and supplemental drives 14, 30.

A command knob 70 is provided to allow the vehicle operator to select the speed relationship to be maintained between the main and supplemental drives 14, 30 during the "automatic" mode. In the preferred embodiment, the supplemental drive 30 can be operated between 0 and 10% faster than the main drive 14. The command knob is movable between a discrete number of positions to enable the operator to select the speed relationship between the main and supplemental drive 14, 30. A command knob sensor means 72 senses the position of the command lever 70 and produces a modifier signal in response the position of the command lever 70. The modifier signal is in the form of a pulse width modulated (PWM) signal having a duty cycle corresponding the position of the command knob 70.

A pressure sensor means 74 senses the pressure of the pressurized fluid supplied to the front wheel motors 34a, 34b by the pump 36 and responsively produces an actual pressure signal. The pressure sensor means 74 is in the form of a pressure transducer 76 which produces an electrical signal having a frequency responsive to the output pressure of the pump 36.

The controller means 50 is electrically connected to the clutch pedal sensor means 26, the transmission sensing means 62, the speed transducers 66a, 66b, the mode switch 68, the command knob sensor means 72 and the pressure transducer 76 for respectively receiving the clutch pedal position, gear code, first and second speed, mode, modifier, and actual pressure signals. The controller means 50 processes these signals to control the supplemental drive 30 in a manner set forth below.

Figure 4A:
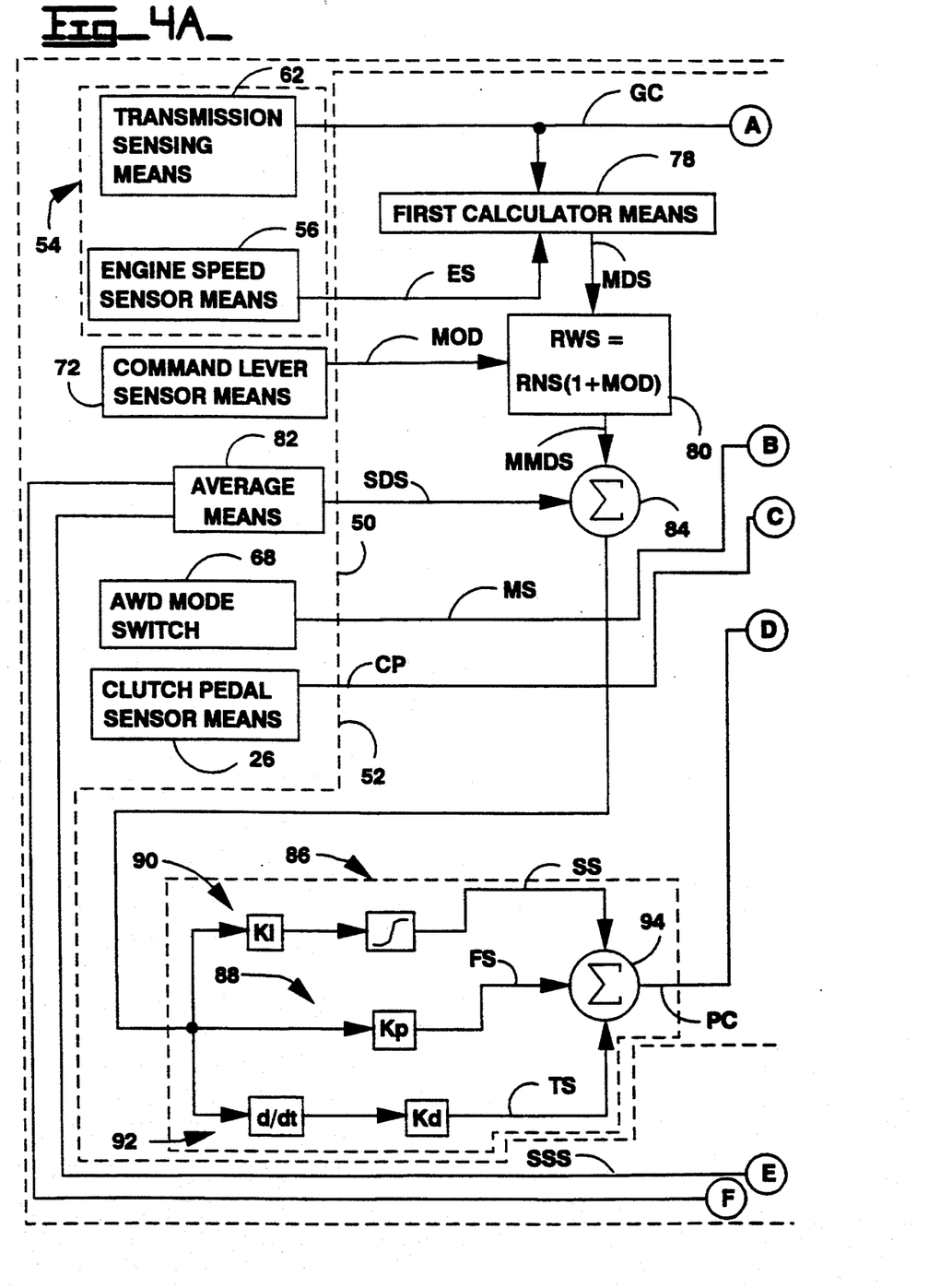
FIGS. 4a and 4B disclose a block diagram of the electronic control of FIG. 2.
Figure 4B:
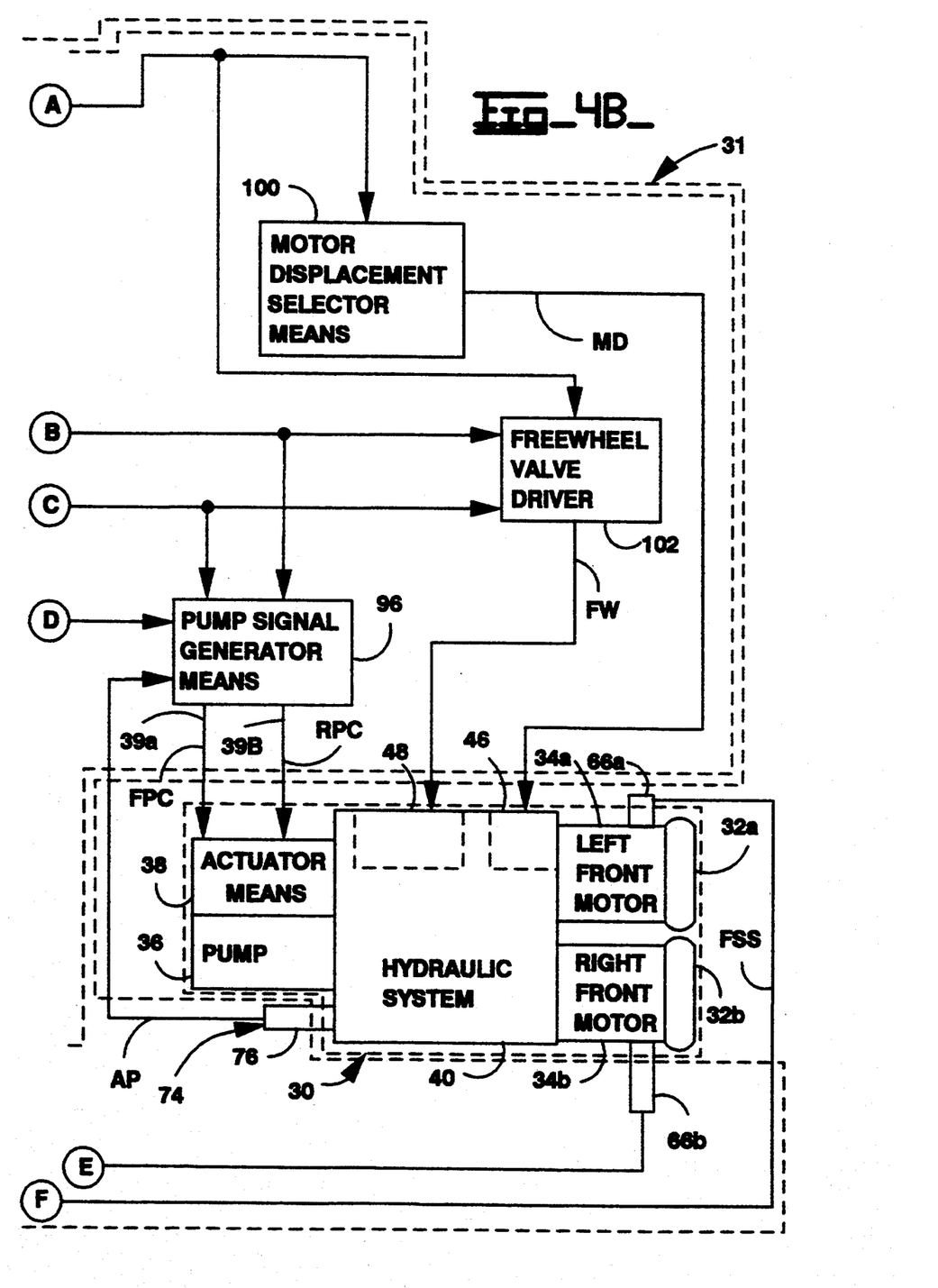
Figure 5A:
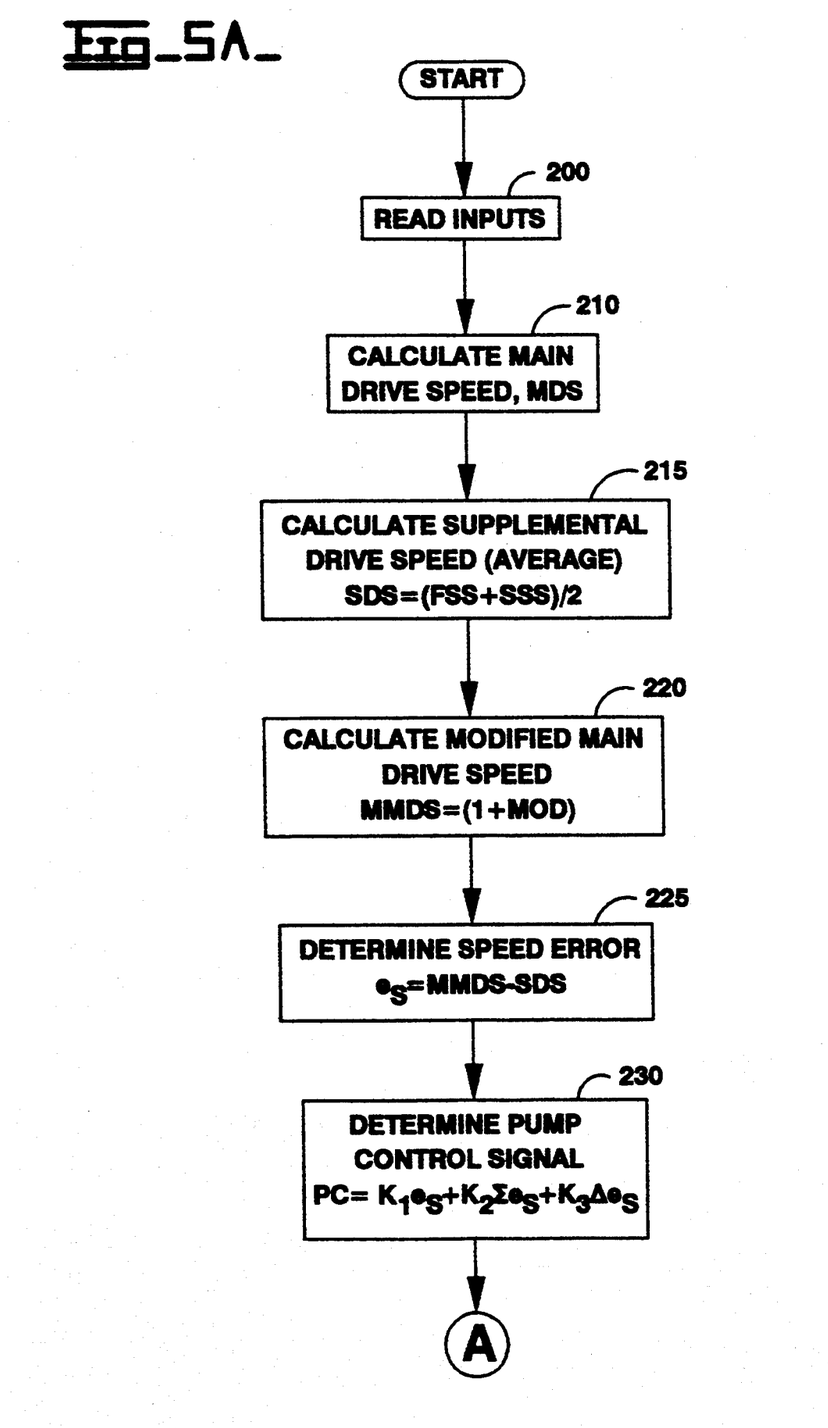
FIGS. 5A–E are flow diagrams of certain functions performed by an embodiment of the immediate vehicle drive control.
Figure 5B:
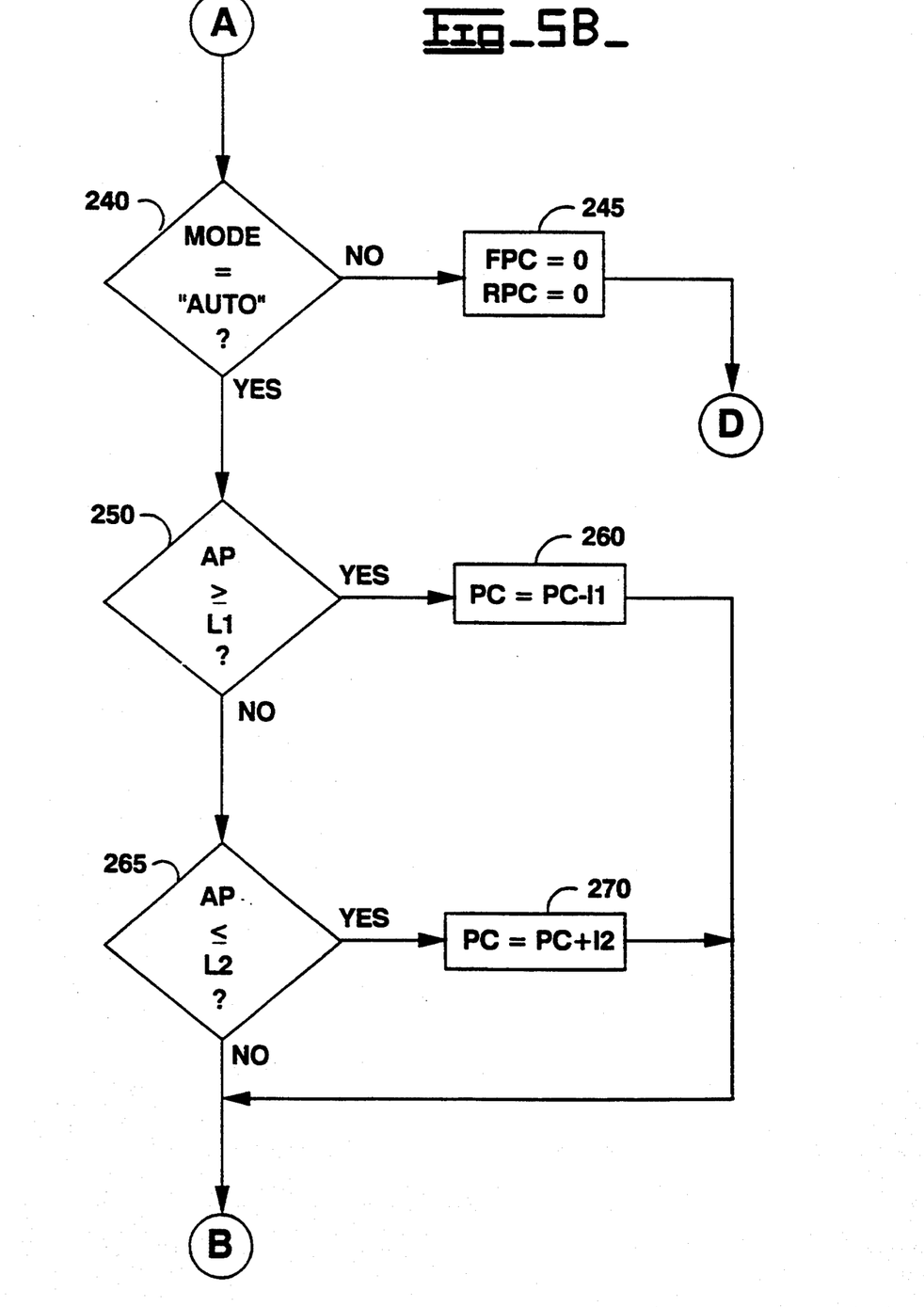
Figure 5C:
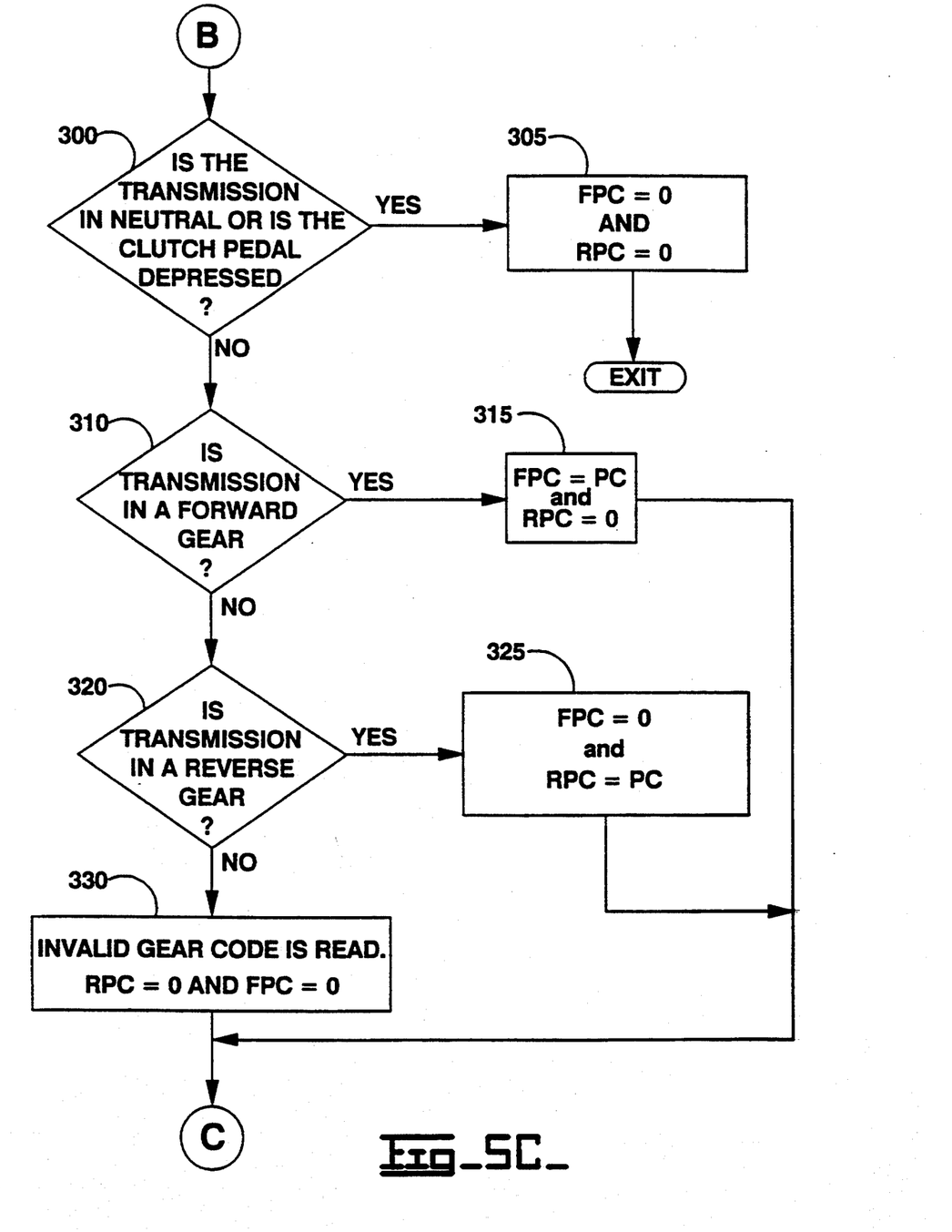
Figure 5D:
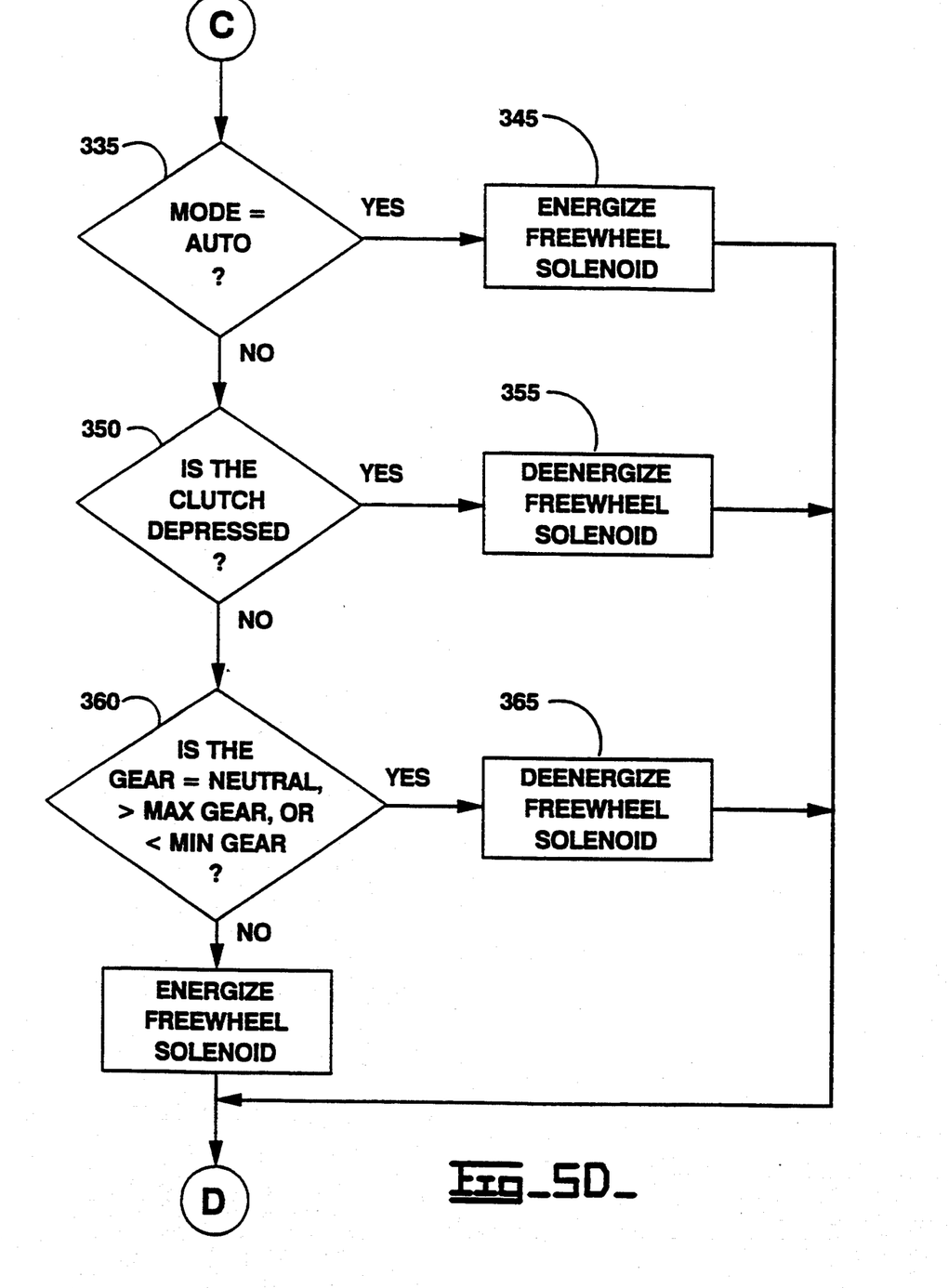
Figure 5E:
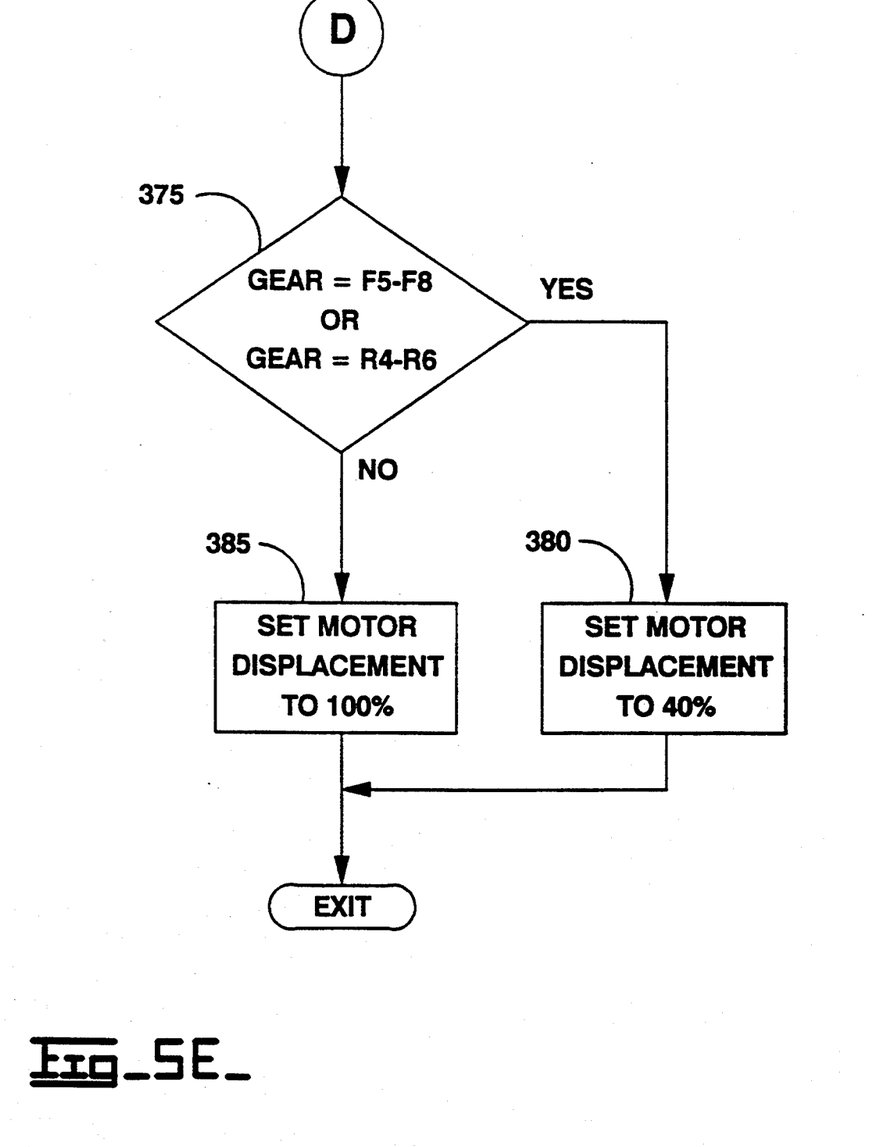

Referring now to FIGS. 4a and 4B operation of the controller means 50 will be discussed in greater detail. In FIGS. 4a, 4B the electrical signals have been assigned references to more readily facilitate the description of the drawing. The controller means 50 includes a calculator means 78 for receiving the gear code and engine speed signals (GC, ES), determining the speed of the rear wheels, and responsively producing a main drive speed signal (MDS). A modifier means 80 receives the main drive speed and modifier signals (MDS, MOD) and responsively produces a modified main drive speed signal (MMDS). More specifically, the modified main drive speed signal (MMDS) is produced in accordance with the following formula:

$$MMDS = MDS * (1 + MOD)$$

As can be seen from the above equation, the modified main drive speed signal (MMDS) will always be greater than or equal to the main drive speed signal (MDS).

The controller means 50 further includes an averaging means 82 which receives the first and second speed signal (FSS, SSS) and responsively produces the supplemental drive speed signal (SDS). As mentioned previously, the supplemental drive speed signal (SDS) is indicative of the average of the first and second speed signals (FS, SS) and thus the average speed of the front drive wheels 32a, 32b. The modified main (MMDS) and supplemental drive SDS) speed signals are delivered to a first summing means 84 which produces a error signal ($e_S$) in response to a difference between the received signals.

The error signal ($e_S$) is delivered to a PID means 86 which process the error signals to produce a pump control signal (PC). The PID means 86 includes a proportion calculating means 88 which produces a first signal (FS) responsive to a product of the error signal ($e_S$) and a preselected constant. An integral calculating means 90 receives the error signal ($e_S$) and produces a second signal (SS) responsive to an integral of the error signal ($e_S$). A derivative calculating means 92 receives the error signal and produces a third signal (TS) responsive to a derivative of the error signal $e_S$. A second summing means 94 receives the first, second, and third signals (FS, SS, TS) and produces the pump control signal (PC) in response to a sum of the received signals. More particularly, the PID means 86 produces the pump control signal (PC) at least in part according to the following formula:

$$PC = K_1 e_S + K \Sigma e_S + k_3 \Delta e_S$$

where $K_1$, $K_2$, $K_3$ are predetermined constants.

In an application such as the present supplemental drive 30, a PID control is advantageous over a proportional control or a proportional integral control because it is more responsive and has better stability in the absence of the error signal ($e_S$). More specifically, the second term, or the integrating term, is provided to keep the pump 36 at the proper displacement in the absence of the error signal ($e_S$). If the integrating term is not used, some type of servo mechanism, such as a mechanical servo, must be provided to accomplish this function. This is undesirable because it adds to the cost and complexity of the supplemental drive system 30. The third term, or the differentiating term, makes the control more responsive because it responds to the rate of change of the error signal ($e_S$). As such it serves to predict the future behavior of the error signal ($e_S$), thereby allowing the control to respond more quickly to changes in the error signal ($e_S$).

A pump signal generator means 96 receives the mode, clutch pedal position, gear code, actual pressure, and pump control signals (MS, CP, GC, AP, PC). The pump signal generator means 96 processes these signals to determine the current operating mode of the main drive 14 and controls the supplemental drive 30 accordingly. More specifically, the pump signal generator means 96 sets the magnitude of the forward and reverse pump current signals (FPC, RPC) in response to the received signals. The forward and reverse pump current signals (FPC, RPC) are delivered to the forward and reverse pump actuators via the conductors 39a, 39b, respectively, thereby controlling pump direction and displacement in a conventional manner.

First the pump signal generator examines the mode signal (MS) to determine if the operator has requested the "off" or "automatic" mode. If the signal indicates the "off" mode, the forward and reverse pump currents signals (FPC, RPC) are both set at zero. The present system is advantageous because the system electronics remain active during the "off" mode. More specifically, the controller means 50 produces the pump control signal (PC) during both the "off" and "automatic" modes. However, during the "off" mode delivery of the control signal to to actuator means 38 is suppressed. Therefore, if an operator subsequently requests the "automatic" mode, the control responds quickly to this request.

If the mode signal (MS) indicates the "automatic" mode, the pump signal generator 96 first checks the actual pressure signal (AP) to determine the fluid pressure in the supplemental drive is above or below first and second preselected limits (L1, L2), respectively. The first preselected limit (L1) is set at the maximum allowable system pressure of 5000 psi as determined by design criteria. Operation at pressures higher than the system pressure are extremely inefficient and can result in fluid losses due to leakage. If the actual pressure signal indicates that the pressure is above 5000 psi, the pump signal generator 96 decreases the pump control signal (PC) by a first preselected amount (I1). The pump control signal (PC) is repeatedly decremented by the first preselected amount (I1) until the actual pressure signal (AP) indicates that the pump pressure is below 5000 psi.

The second predetermined limit (L2), or lower pressure limit, is set to ensure that the piston rollers 43 and cam rings 44 remain engaged during operation of the supplemental drive 30. If the pressure is allowed to drop below the second preselected limit, it is possible for the motors 34a, 34b to be damaged. More specifically, at pressures lower than the second preselected limit (L2), the pistons 42 only partially extend. As the cams rings rotate 44, due to movement of the vehicle 10, the cam rings 44 collide with the partially extended pistons 42, thereby damaging the motors 36a, b. The lower limit is dependent on the specifications of the motors 34a, 34b and the hydraulic system 40, and has been empirically determined to be 700 psi for the immediate supplemental drive 30. If the actual pressure signal (AP) indicates that hydraulic pressure is below 700 psi, the pump signal generator 96 increments the pump control signal (PC) by a second preselected amount (I2). The pump controller means 96 repeatedly increments the pump control signal by the second preselected amount (I2) until the actual pressure signal (AP) indicates that the pump pressure exceeds 700 psi.

The pump signal generator 96 then examines the gear code signal (GC) to determine the operating mode of the main transmission 18. If the gear code signal (GC) indicates that the main transmission 18 is in 8th gear forward, neutral, 6th gear reverse the forward and reverse pump current signals (FPC, RPC) are both set to zero. The forward and reverse pump current signals (FPC, RPC) are also set to zero if the clutch pedal position signal (CP) indicates that the clutch pedal 22 is depressed. If the transmission 18 is in forward gears 1–7 the forward pump current signal (FPC) is set to the value of the pump control signal (PC) and the reverse pump current signal (RPC) is set to zero. Conversely if the transmission 18 is in reverse gears 1–5 the reverse pump current signal (RPC) is set to the value of the pump control signal (PC) and the forward pump current signal (FPC) is set to zero.

A motor displacement selector means 100 receives the gear code signal (GC) and responsively produces the motor displacement signal (MD). The motor displacement signal (MD) is in the form of a current signal which is either "off" or "on" at a level required to energize the solenoid actuated valve of the motor displacement means 46. When the solenoid actuated valve is energize, the motors are at 40% displacement and when the solenoid actuated valve is deenergized the motors are at 100% displacement. The motor displacement selector 100 checks the gear code signal (GC) and sets the magnitude of the motor displacement signal (MD) appropriately. More specifically, if the gear code signal (GC) indicates that the transmission 18 is in forward gears 1–4 or reverse gears 1–3, the motor displacement signal (MD) is "off", thereby deenergizing the solenoid actuated valve. When the transmission is in forward gears 5–8 or reverse gears 4–6, the motor displacement signal (MD) is "on", thereby energizing the solenoid actuated valve.

A freewheel driver means 102 receives the mode, gear code, and clutch position signals (MS, GC, CP) and selectively produces a freewheel signal (FW) which is delivered to the freewheel solenoid 48. The freewheel signal (FW) is either "off" or "on" at a magnitude required to energize the freewheel solenoid 48. The freewheel signal (FW) is "off" if the mode selector 68 is in the "off" position or if the clutch pedal 24 is depressed. Furthermore, the freewheel signal (FW) is "off" if the main transmission 18 is in neutral, in forward gear 8 or reverse gear 6, thereby preventing operation of the supplemental drive 30 at high ground speeds.

Referring now to FIGS. 5a–e, flow diagrams which can be used to program the microprocessor 52 to perform certain functions immediate vehicle drive control will be discussed. Initially, in the block 200, the input signals from the various sensor are read and variables in memory are set in accordance with the sensed values. Next in the block 210, the speed of the main drive is determined in response to the gear code and engine speed signals (GC, ES). More specifically, the gear code signal (GC) is used to access a lookup table stored in memory for determining the gear ratio of the main transmission 18. The lookup table produces a unique gear ratio signal (GR) for each transmission gear ratio in response to the gear code signal (GC). The gear ratio and engine speed signals (GR, ES) are used in the following formula, which is stored in memory and accessed to produce the main drive speed signal:

$$MDS = \frac{ES}{GR} * 2\pi R$$

where R represents the rolling radius of the main drive tires.

Thereafter, in the block 215, the supplemental drive speed signal (SDS) is produced response to an average of the first and second speed signals (FSS, SSS). Control is then passed to the block 220 where the modified main drive speed signal (MMDS) is produced in response to the modifier and main drive speed signals (MOb, MDS). More specifically, the modified main drive speed signal (MMDS) is produced in accordance with the following formula:

$$MMDS = MDS * (1 + MOD)$$

Next, in the block 225, the error signal ($e_S$) is calculated in response to a difference between the modified main and supplemental drive speed signals (MMDS, SDS). Control is then passed to the block 230 where the pump control signal (PC) is calculated in accordance with the following equation:

$$PC = K_1 e_S + K_2 \Sigma e_S + K_3 \Delta e_S$$

where $K_1$, $K_2$, $K_3$ are predetermined constants stored in memory.

Control is then passed to a pump signal generator routine which is shown in the blocks 240–330. The pump signal generator routine processes the mode, clutch pedal position, gear code and pump control signals (MS, CP, GC, PC) to control operation of the supplemental drive 30. Initially, in the block 240, the mode signal (MS) is examined and control is passed to the block 245 if the mode signal (MS) does not corresponds to the "automatic" mode of operation. In the block 295 the forward and reverse pump current signals (FPC, RPC) are both set to zero and then control is passed to the block 335 to begin execution of a freewheel routine as explained below.

Otherwise control is passed to the block 250 where the actual pressure signal (AP) is examined. If the actual pressure signal (AP) indicates that the pump pressure is above 5000 psi, the pump signal generator 96 decreases the pump control signal (PC) by a first preselected amount (I1) in the block 260. However, if the actual pressure signal (AP) is less than the first predetermined limit (L1), control is passed to the block 265. In the block 265 the actual pressure signal is compared to a second predetermined limit (L2), and control is passed to the block 270 if the actual pressure signal (AP) is less than or equal to the second predetermined limit (L2). In the block 270 the pump control signal (PC) is incremented by a second preselected amount (I2).

Control is then passed to the block 300 where the gear code and clutch pedal signals (GC, CP) are examined. If the clutch pedal 22 is depressed or the transmission 18 is in neutral, control is passed to the block 305 where the forward and reverse pump current signals (FPC, RPC) are both set to zero and then control is routed to the block 335.

If the tests in block 300 are negative, control is passed to the block 310 where the gear code signal (GC) is examined to determine if the transmission 18 is in a forward gear. If it is, control is passed to the block 315 where forward pump current signal (FPC) is set to the pump control signal (PC) and reverse pump current signal (RPC) is set to zero.

Otherwise, control is passed to the block 320 where the gear code (GC) signal is again examined to determine if the transmission 18 is in a reverse gear. If it is, control is passed to the block 325 where reverse pump current signal (RPC) is set to the pump control signal (PC) and forward pump current signal (FPC) is set to zero.

Conversely, if in the block 320 it is determined that the transmission 18 is not in a reverse gear, the gear code signal (GC) is assumed to be invalid and control is passed to the block 330. In the block 330 the forward and reverse pump current signals (FPC, RPC) are both set to zero.

Thereafter, control is passed to the block 335. The block 335 is the start of a freewheel control routine which continues through the block 370. In the block 335 the mode signal (MS) is examined and control is passed to the block 345 if the mode signal (MS) does not correspond to the "automatic" mode. In the block 345 the freewheel signal (FW) is turned "off", thereby deenergizing the freewheel solenoid 48 and causing the motors 34a, b to "freewheel" as explained above. From the block 345, control is passed to the block 375.

Otherwise control is passed to the block 350 where the clutch pedal signal (CP) is examined to determine if the clutch pedal is depressed. If it is, control is passed to the block 355 where the freewheel signal (FW) is turned "off". This is done to disable the supplemental drive 30 when the main transmission 18 is in neutral. Control is routed to the block 375 from the block 355.

However, if the clutch pedal is not depressed, control is passed to the block 360 where the gear code signal (GC) is examined to determine the operating gear of the main transmission 18. If the transmission 18 is in neutral, forward gear 8, or reverse gear 6 control is passed to the block 365 where the freewheel signal (FW) is turned "off" and control is then passed to the block 375. Otherwise, control is passed to the block 370 where the freewheel signal is turned "on" causing the freewheel solenoid 48 to become energized.

In the block 375 the gear code signal (GC) is again examined to determine the operating mode of the main transmission 18. If the gear code signal (GC) indicates that the main transmission 18 is in forward gears 5-8 or reverse gears 4-6, the motor displacement signal (MD) is turned "on", thereby causing the motors to operate at 40% displacement. Otherwise, the motor displacement signal (MD) is turned "off", thereby causing the motors to operate at 100% displacement.

The above supplemental drive routine is repeatedly executed throughout operation of the vehicle 10 for producing efficient operation of the supplemental drive 30. Other aspects, objects, and advantages of this invention can be obtained from a study of the drawings, the disclosure, and the appended claims.

INDUSTRIAL APPLICABILITY

Assume that the supplemental drive 30 is initially in the "off" mode. The processor means 52 means produces the error signal ($e_S$) in response to a difference between supplemental and modified main drive speed signals (SDS, MMDS). The error signal ($e_S$) is delivered to the PID means 86 which produces the pump control signal (PC) in response to the error signal. However, the pump signal generator means 96 sets both the forward and reverse pump currents (FPC, RPC) to zero in response to the mode signal (MS) indicating the automatic mode. Furthermore, the freewheel driver means 102 receives the mode signal (MS) and sets the freewheel signal to "off" in response to the mode signal indicating the "off" mode. This causes the motor pistons 42 to disengage the cam rings 44, thereby allowing the front wheels rotate freely in response to movement of the vehicle.

At some point in time, the operator moves the mode switch 68 to the "automatic" mode. The pump signal generator means 96 senses this and then processes the gear code (GC) signal to determine the operating mode of the main transmission 18. If the main transmission is in 8th gear forward, neutral, or 6th gear reverse, the forward and reverse pump current signals (FPC, RPC) are both set to zero. However, if none of these conditions are met, the pump signal generator means 96 delivers either the forward or reverse pump current signals (FPC, RPC) to the forward and reverse actuators, respectively, in response to the direction of the main transmission 18. This causes the pump 36 to operate in a direction and at a displacement which tends to minimize the error signal, thereby maintaining the desired speed relationship between the main and supplemental drive 14, 30. Furthermore, the freewheel driver means 102 senses that the mode signal (MS) indicates the "automatic" mode and responsively turns the freewheel signal (FW) "on". This causes the pistons 42 to engage and drive the cam rings 44, thereby driving the front wheels 32a, 32b at the desired speed.

We claim:

1. An electronic control for a work vehicle having an engine, a main drive connected to and driven by said engine, said main drive being rotatable at a desired speed, a fluid pump connected to and driven by said engine, said fluid pump delivering pressurized fluid flow, and a supplemental drive having a pair of wheels and being rotatively driven by said pressurized fluid flow at a desired speed, comprising:

main drive sensor means for sensing a speed of the main drive and responsively producing a main drive speed signal;

means for producing a modifier signal corresponding to a desired speed relationship between the main and supplemental drives;

modifier means for receiving said modifier and main drive speed signals and responsively producing a modified main drive speed signal;

supplemental drive sensor means for sensing a speed of each wheel of said supplemental drive and responsively producing first and second supplemental drive speed signals;

processor means for receiving said modified main and first and second supplemental drive speed signals, averaging the first and second supplemental drive speed signals and producing an average supplemental drive speed signal, producing an error signal responsive to a difference between said modified main and average supplemental drive speed signals, producing a first signal responsive to a product of said error signal and a preselected constant, producing a second signal responsive to an integral of said error signal, producing a third signal responsive to a derivative of said error signal, producing a pump control signal responsive to a sum of said first, second, and third signals; and actuator means for receiving said pump control signal and responsively adjusting said pump so as to vary the pressure of the pressurized fluid produced by said pump in response to said pump control signal.

2. An electronic control, as set forth in claim 1, including a pressure sensor means for sensing the pressure of the pressurized fluid delivered to said supplemental drive by said pump and responsively producing an actual pressure signal, said processor means receiving said actual pressure signal and responsively modifying said pump control signal.

3. An electronic control, as set forth in claim 2, wherein said processor means reducing said pump control signal in response to said actual pressure signal exceeding a first predetermined limit.

4. An electronic control, as set forth in claim 2, wherein said processor means increasing said pump control signal in response to said actual pressure signal falling below a second predetermined limit.

5. An electronic control, as set forth in claim 1, wherein said processor means produces said pump control signal according to the following formula:

$$PC = K_1 e_S + K_2 \Sigma e_S + K_3 \Delta e_S$$

where PC represents the pump control signal, $e_S$ represents the error signal, and $K_1$, $K_2$ and $K_3$ are predetermined constants.

* * * * *